United States Patent [19]

Vesco et al.

[11] Patent Number: 5,119,568
[45] Date of Patent: Jun. 9, 1992

[54] FEELER DEVICE, PARTICULARLY FOR COPYING MACHINES

[75] Inventors: Mario Vesco; Giancarlo Zaramella, both of Turin, Italy

[73] Assignee: Fidia S.P.A., Turin, Italy

[21] Appl. No.: 729,915

[22] PCT Filed: Jan. 11, 1988

[86] PCT No.: PCT/EP88/00011

§ 371 Date: Sep. 15, 1988

§ 102(e) Date: Sep. 15, 1988

[87] PCT Pub. No.: WO88/05524

PCT Pub. Date: Jul. 28, 1988

Related U.S. Application Data

[63] Continuation of Ser. No. 252,417, Sep. 15, 1988, abandoned.

[51] Int. Cl.⁵ .................................................. G01B 5/03
[52] U.S. Cl. .......................................... 33/559; 33/561
[58] Field of Search .................... 33/23.11, 588, 559, 33/561, 832; 73/862.4

[56] References Cited

U.S. PATENT DOCUMENTS

| | | | |
|---|---|---|---|
| 3,869,799 | 3/1975 | Neuer et al. | 33/561 |
| 3,945,124 | 3/1976 | Jacoby et al. | 33/559 |
| 4,270,275 | 6/1981 | McMurtry | 33/561 |
| 4,611,403 | 9/1986 | Morita et al. | 33/561 |
| 4,621,434 | 11/1986 | Hirschmann | 33/558 X |
| 4,660,296 | 4/1987 | Klingler et al. | 33/559 |
| 4,763,531 | 8/1988 | Dietrich et al. | 73/862.04 |

FOREIGN PATENT DOCUMENTS 2035564 6/1980 United Kingdom.

OTHER PUBLICATIONS

Patent Abstracts of Japan, vol. 9, No. 199, (P-380) (1922) Aug. 16, 1985 & JP,A, 6064206. Seimitsu et al, Apr. 12, 1985, (1 page) (WO88/05524).

"Gear Inspection On a Multi-Coordinate Measuring Machine", H. J. Neumann, 5th International Conference, 12th IPA Meeting, Jun. 24-26, 1980, 14 pages.

Primary Examiner—Daniel M. Yasich
Attorney, Agent, or Firm—Sughrue, Mion, Zinn, Macpeak & Seas

[57] ABSTRACT

The device comprises a support structure movable along at least a first reference axis, a feeler member carried by the structure so as to be able to effect limited relative displacements along the axis relative to a predetermined rest position, and detector means for providing electrical signals indicative of the magnitude and direction of the movements of the feeler member relative to the structure. According to the invention, the feeler device comprises at least a first intermediate structure supported by the structure by first blades which can be bent in a plane parallel to the reference axis; the feeler member is also supported by this intermediate structure by second blades having bending characteristics substantially the same as those of the first blades in a plane parallel to the references axis. The feeler device may be made so as to be able to detect movements of the feeler member relative to the support structure along two or three independent axes as well.

19 Claims, 9 Drawing Sheets

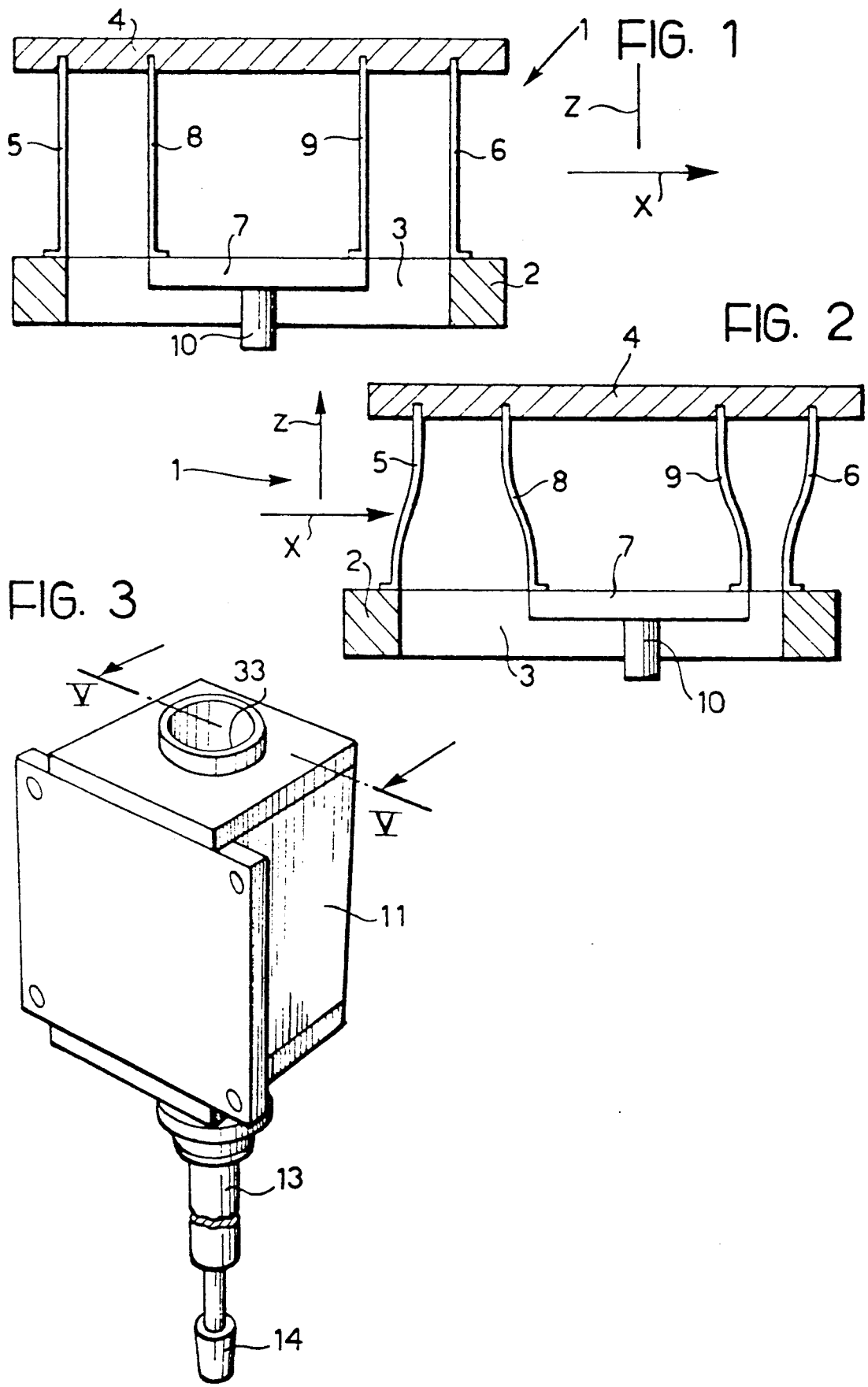

2

FEELER DEVICE, PARTICULARLY FOR COPYING MACHINES

This is a continuation of application No. 07/252,417 filed Sep. 15, 1988, now abandoned.

BACKGROUND OF THE INVENTION

The present invention relates to a feeler device for a copying machine. More specifically, the invention relates to a feeler device of the type comprising:

a support structure movable along at least a first reference axis, a feeler member supported by the structure so as to be able to effect limited movements relative to the structure along the axis relative to a predetermined rest position, and detector means for providing electrical signals indicative of the magnitude and direction of the relative movements of the feeler member.

A feeler device of this type is known, for example, from the publication "Gear inspection on a multi-coordinate measuring machine", by H. J. Neumann, a reprint of a paper given during the 5th International Conference on Automated Inspection and Product Control, 12th IPA Meeting, Stuttgart, 24-26th June 1980, edited by Carl Zeiss, Oberkochen, Federal Republic of Germany.

In this known device (see, for example, page 7, FIG. 7 of this publication) the ability of the feeler to move relative to the structure along one axis (for example, a horizontal axis) is achieved by means of the suspension of the feeler from the support structure by means of a pair of rigid blades articulated at their upper ends to the structure and at their lower ends to a plate which is firmly connected to the feeler. The assembly formed by the support structure, the blades and the plate which carries the feeler constitutes a sort of articulated parallelogram whereby a movement of the feeler relative to the support structure along the reference axis results at the same time in a variation in the position of the feeler (relative to the support structure) along the vertical axis.

This characteristic of the known device is a disadvantage which the present invention attempts to overcome.

SUMMARY OF THE INVENTION

The object of the present invention, therefore, is to provide a feeler device of the aforesaid type, in which a movement of the feeler member relative to a coordinate axis does not also involve a variation in the position of the feeler along the other axes.

This object is achieved according to the invention by means of a feeler device of the type specified above, the main characteristic of which lies in the fact that it includes a first intermediate structure connected to the support structure by first resiliently deformable blades which can bend in a plane parallel to the said reference axis, and in that the feeler member is supported by the intermediate structure through second resiliently deformable blades having bending characteristics substantially the same as those of the first blades in a plane parallel to the reference axis.

Feeler devices also fall within the scope of the present invention in which the support structure is movable along two or three reference axes and the feeler member is supported by the structure so as to be able to effect limited relative movements along these two or three reference axes.

BRIEF DESCRIPTION OF THE DRAWINGS

Further characteristics and advantages Of the invention will become apparent from the detailed description which follows with reference to the appended drawings, provided purely by way of non-limiting example, in which:

FIGS. 1 and 2 show two different conditions of a structure illustrative of the principle on which the feeler device of the present invention is based, FIG. 3 is a perspective view of a first embodiment of a feeler according to the present invention.

DETAILED DESCRIPTION OF THE INVENTION

Figure 4:
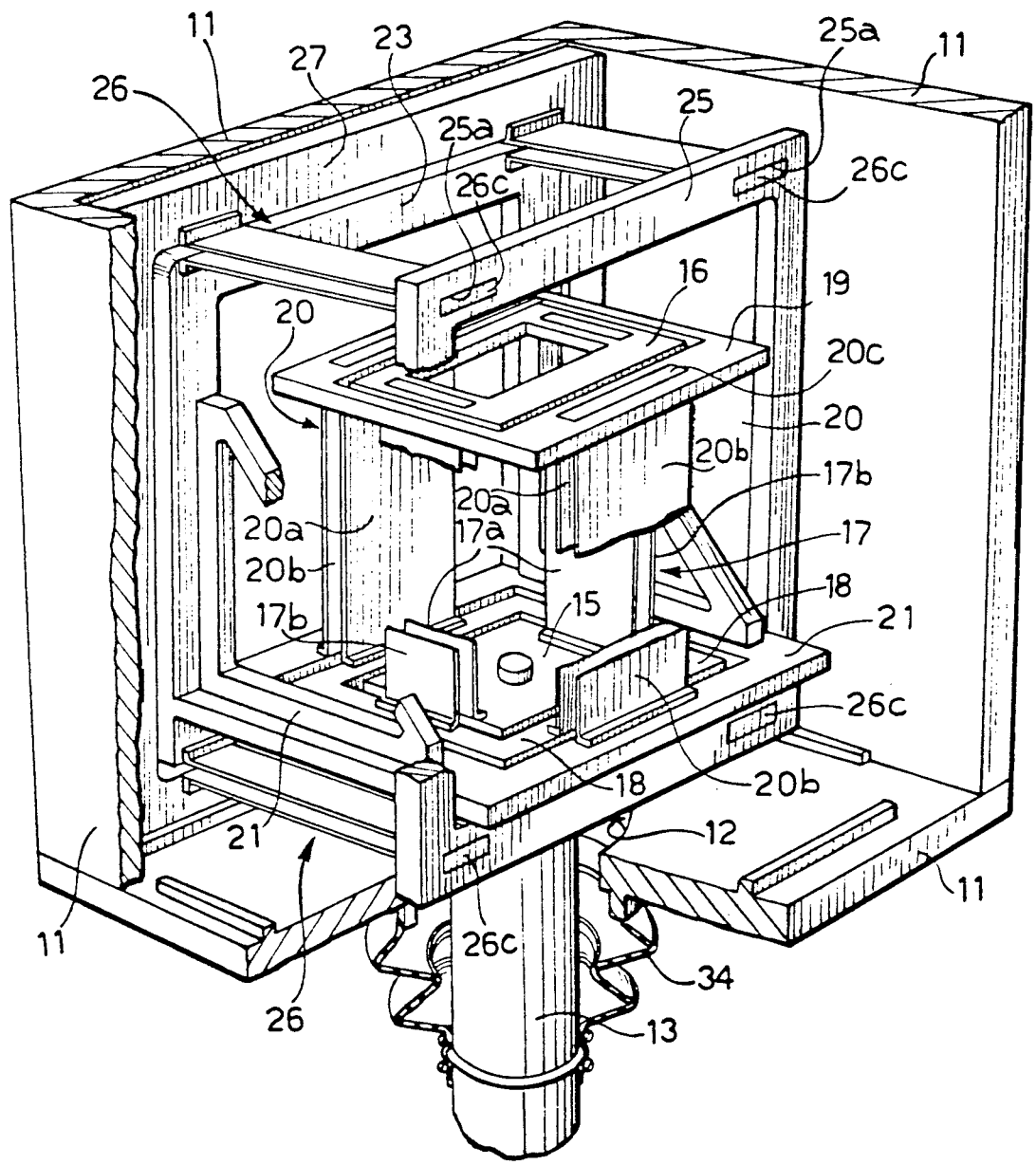
FIG. 4 is a partially-sectioned perspective view of the feeler of FIG. 3, FIGS. 5 and 6 are sections taken on the lines V—V of FIG. 3 and VI—VI of FIG. 5.

FIG. 1 shows a simple illustrative structure 1 which enables the principle on which the feeler device of the invention is based to be understood easily. The structure includes an annular member 2 whose opening is indicated 3. A plate, indicated 4, is supported by the annular member 2 by means of a first pair of resiliently deformable blades 5 and 6 which can bend in the plane of the drawing. These blades are fixed firmly at their ends, at one end to the member 2 and at the other to the plate 4. A further plate 7 is supported by the plate 4 by means of a further pair of resiliently deformable blades 8 and 9 which can bend in the plane of the drawing. The blades 8 and 9 are firmly fixed at one end to the plate 7 and at the other to the plate 4. Moreover, these blades have the same bending characteristics as the blades 5 and 6 at least as regards their bending in the plane of the drawing.

To the centre of the lower face of the plate 7 is connected a shaft 10 extending perpendicular to this plate.

A reference axis parallel to the plates 4 and 7 and to the annular member 2 is indicated X.

If a force is applied to the shaft 10 in a direction parallel to and in the same direction as the axis X, the structure shown in FIG. 1 takes on the deformed configuration shown in FIG. 2: the blades 5, 6 and 8, 9 bend in the manner illustrated and the plate 7 moves to the right, parallel to the axis X, but remains in the same plane as it was in previously.

The elementary structure shown in FIG. 1 therefore has the characteristic of allowing a movement of the plate 7 relative to the annular member 2 along the axis X without at the same time allowing a movement of the plate 7 along, for example, the axis Z. As will be apparent from the description below, the feeler device according to the present invention is based on the use of this advantageous characteristic of the elementary structure.

FIGS. 3 to 8 illustrate a first embodiment of the feeler device according to the invention, with a feeler member movable along three independent axes.

Figure 5:
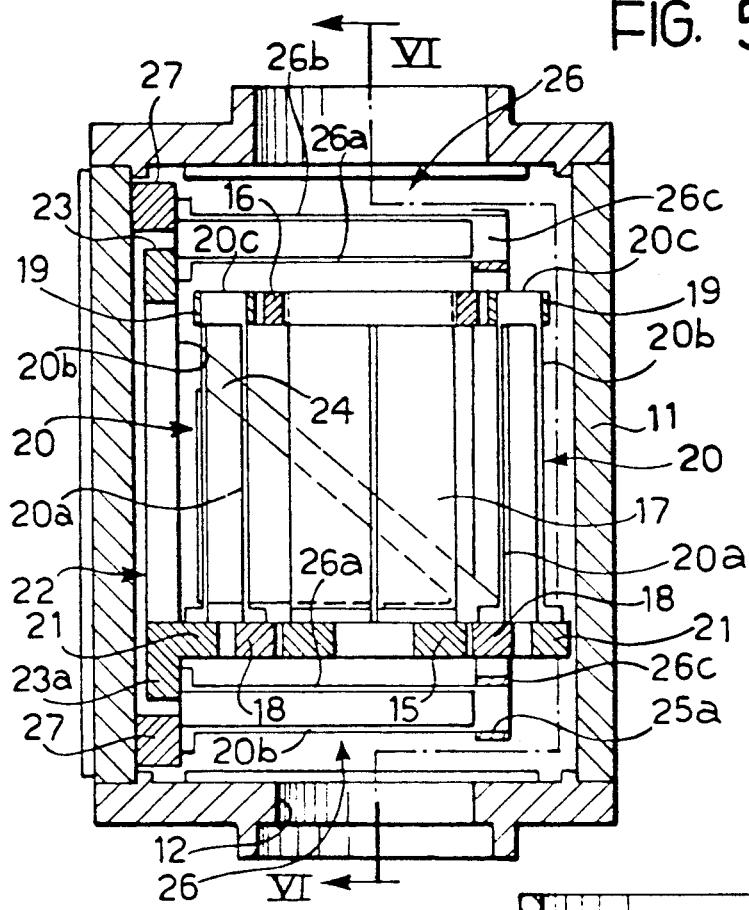
Figure 6:
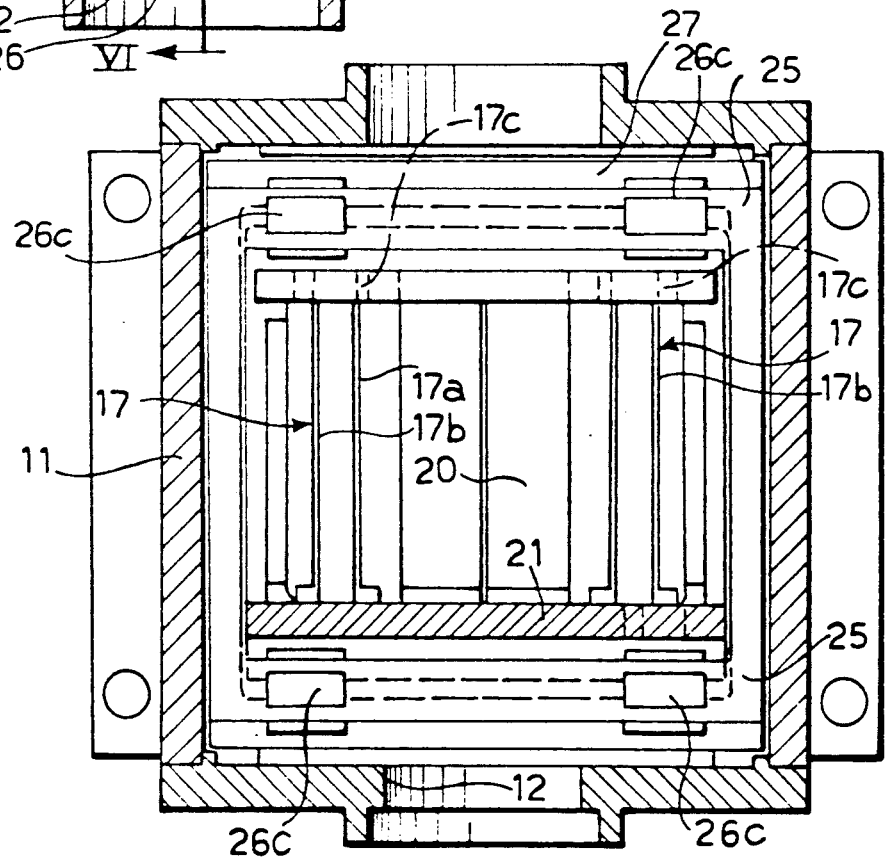

The feeler device shown in FIG. 3 includes a rigid housing 11, for example of metal, which in the embodiment illustrated is substantially parallelapipedal in shape. As shown in FIGS. 4 to 6, the lower wall 11a of this housing has a central circular aperture 12 through which a shaft 13 carrying a feeler point 14 at its lower end (FIG. 3) extends with clearance.

Figure 7:
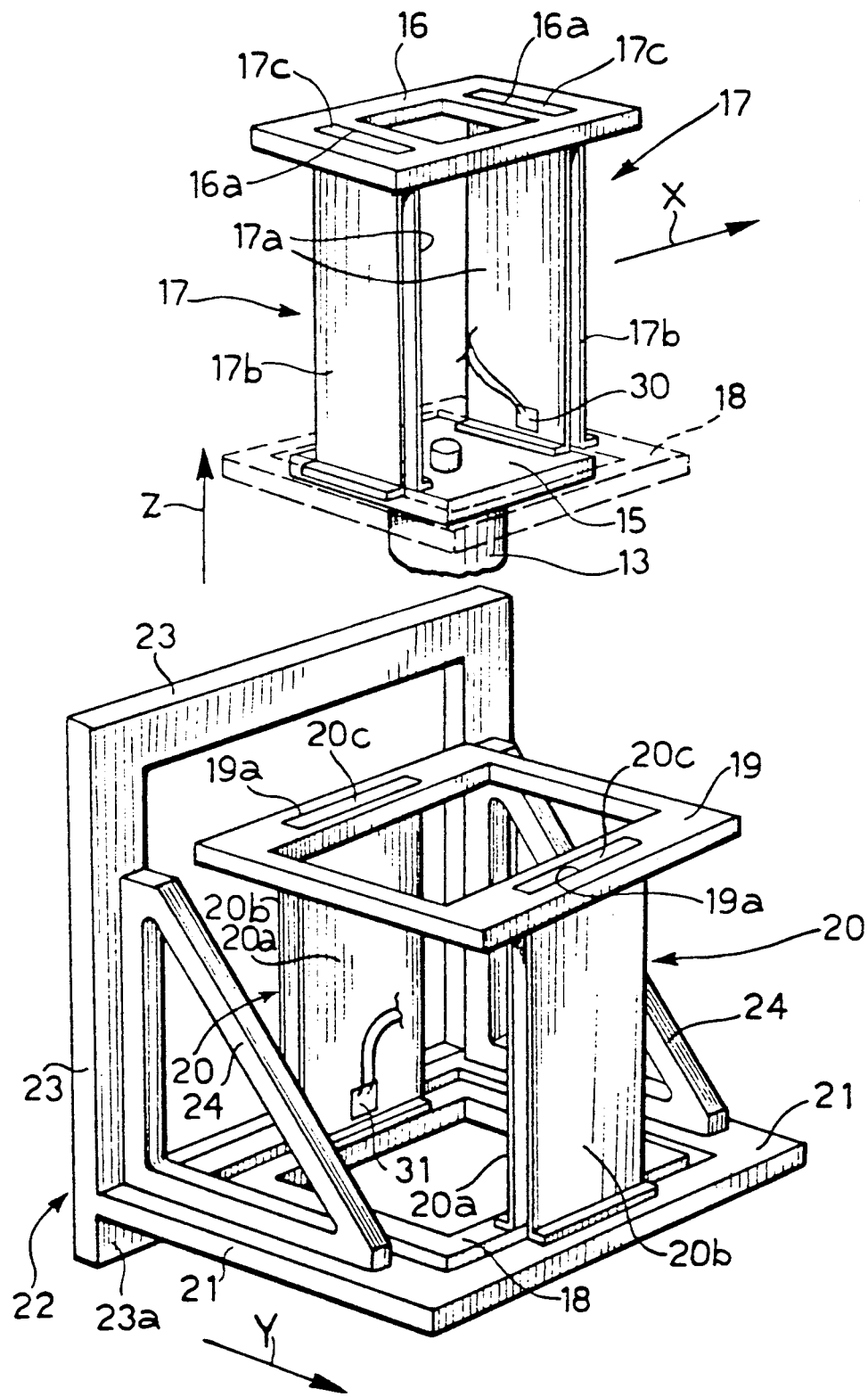
FIG. 7 is an exploded perspective view of parts of the feeler shown in the preceding drawings.

The other end of the feeler point 14 is fixed to a square plate 15 oriented parallel to the lower wall of the housing 11. This plate is connected to an overlying rectangular annular frame 16 by means of substantially channel-shaped suspension members 17. The suspension, members have respective rigid end portions 17c fixed in slots 16a formed in the parallel sides of the frame 16 (FIG. 7). From the fixed end portion 17c of each of these suspension members extend two parallel arms constituted by metal blades 17a, 17b which are resiliently deformable under bending stresses. The blades 17a which face the two suspension members 17 are fixed rigidly at their lower ends to opposite sides of the plate 15. The outer blades 17b of the two suspension members have their respective lower ends rigidly fixed to opposite sides of a second rectangular annular frame 18 surrounding the plate 15 with clearance and coplanar therewith.

The partial structure comprising the plate 15, the frame 16, the suspension member 17 and the frame 18 corresponds essentially to the illustrative structure shown in FIGS. 1 and 2. When the feeler 13-14 is subjected to a force along the axis X of FIG. 7 (an axis which is perpendicular to the planes in which the blades 17a, 17b lie at rest), it moves along this axis without effecting any movement along the axis Z of FIG. 7, since the plate 15 moves relative to the frame 18 but remains in the same plane.

As shown particularly in the lower part of FIG. 7, the frame 18 is connected in its turn to an overlying rectangular annular frame 19 by suspension members 20 similar to the suspension members 17. The frame 19 surrounds the frame 16 with clearance and is coplanar therewith.

The suspension members 20 have respective rigid anchoring end portions 20c fixed firmly in corresponding slots 19a in two opposite sides of the frame 19 (FIGS. 4 and 7).

The blade-shaped arms 20a, 20b of the suspension members 20 extend in planes parallel to the axes X and Z, and hence perpendicular to the axis Y. The lower ends of the inner blades 20a are fixed rigidly to the outer edges of two opposite sides of the frame 18 (FIG. 7).

The lower ends of the outer blades 20b are fixed rigidly to two opposite sides of a rectangular-annular-shaped horizontal portion 21 of a frame, generally indicated 22. This frame has a rectangular annular portion 23 disposed in vertical plane which is at a right angle behind the plane in which the portion 21 lies (FIG. 7). The horizontal and vertical portions 21, 23 of the frame are also interconnected by integral reinforcing struts, indicated 24. The portion 21 of the frame 22 surrounds the frame 18 with clearance and is coplanar therewith.

The partial structure comprising the frames 18 and 19, the suspension members 20 and the portion 21 of the frame 22 together constitute another structure equivalent to the illustrative structure shown in FIG. 1. When a force is applied to the shaft 13 along the axis Y, this force is transmitted practically rigidly to the frame 18 through the plate 15, the frame 16 and the suspension members 17 which transmit forces rigidly along the axis Y. The frame 18 can thus effect a movement, albeit limited, along the axis Y relative to the portion 21 of the frame 22, without this frame departing from its plane of rest, which is in fact the same plane as that in which the plate 15 and the portion 21 of the frame 22 lie.

A further rectangular frame, indicated 25, (FIGS. 4, 5 and 8) is disposed in a plane parallel to the axes X and Z and faces the portion 23 of the frame 22. The frame 25 has upper and lower horizontal sides which extend with clearance above and below the planes of the frames 19 and 18, respectively. Moreover, as shown particularly in FIG. 4, the vertical sides of the frame 25 are spaced from the frames 19 and 21.

The frame 25 is connected to the vertical portion 23 of the frame 22 by four suspension members 26 which are structurally similar to the suspension members 17 and 20 described above. The suspension members comprise respective rigid anchorage portions 26c fitted rigidly into corresponding slots 25a adjacent the ends of the horizontal sides of the frame 25. The lower suspension members 26 have respective blade-shaped portions 26a, 26b which are resiliently deformable to bend in the plane Y-Z. The upper blades 26a of these lower suspension members 26 are rigidly connected to an extension 23a of the vertical portion 23 of the frame 22 which extends beneath the plane of the portion 21 (FIGS. 5 and 7).

The lower blades 26a of the upper suspension members 26 are fixed rigidly to the upper side of the portion 23 of the frame 22.

The outer blades 26b of the suspension members 26 are fixed rigidly to the horizontal sides of a further frame 27 (FIGS. 5 and 8) fixed to a side wall of the housing 11 parallel to the axes X and Z. The frame 27 surrounds the portion 23, 23a of the frame 22 with clearance. The thickness of the frame 27 is also greater than the thickness of the portion of the frame 22 so that, at rest, as shown in FIG. 5, the frame 22 is spaced from the side wall of the housing which is connected to the frame 27.

The partial structure comprising the frame 22, the frame 25, the suspension members 26 and the frame 22 together form a structure conceptually equivalent to the elementary illustrative structure shown in FIGS. 1 and 2.

When the shaft of the feeler device is subject to a force along the axis Z in use, this force is propagated rigidly to the frame 22 which consequently moves, albeit to a limited extent, relative to the frame 27, and hence relative to the housing 11, along the axis Z. This movement occurs without the portion 23 of the frame 22 leaving the plane in which it lies at rest.

Figure 8:
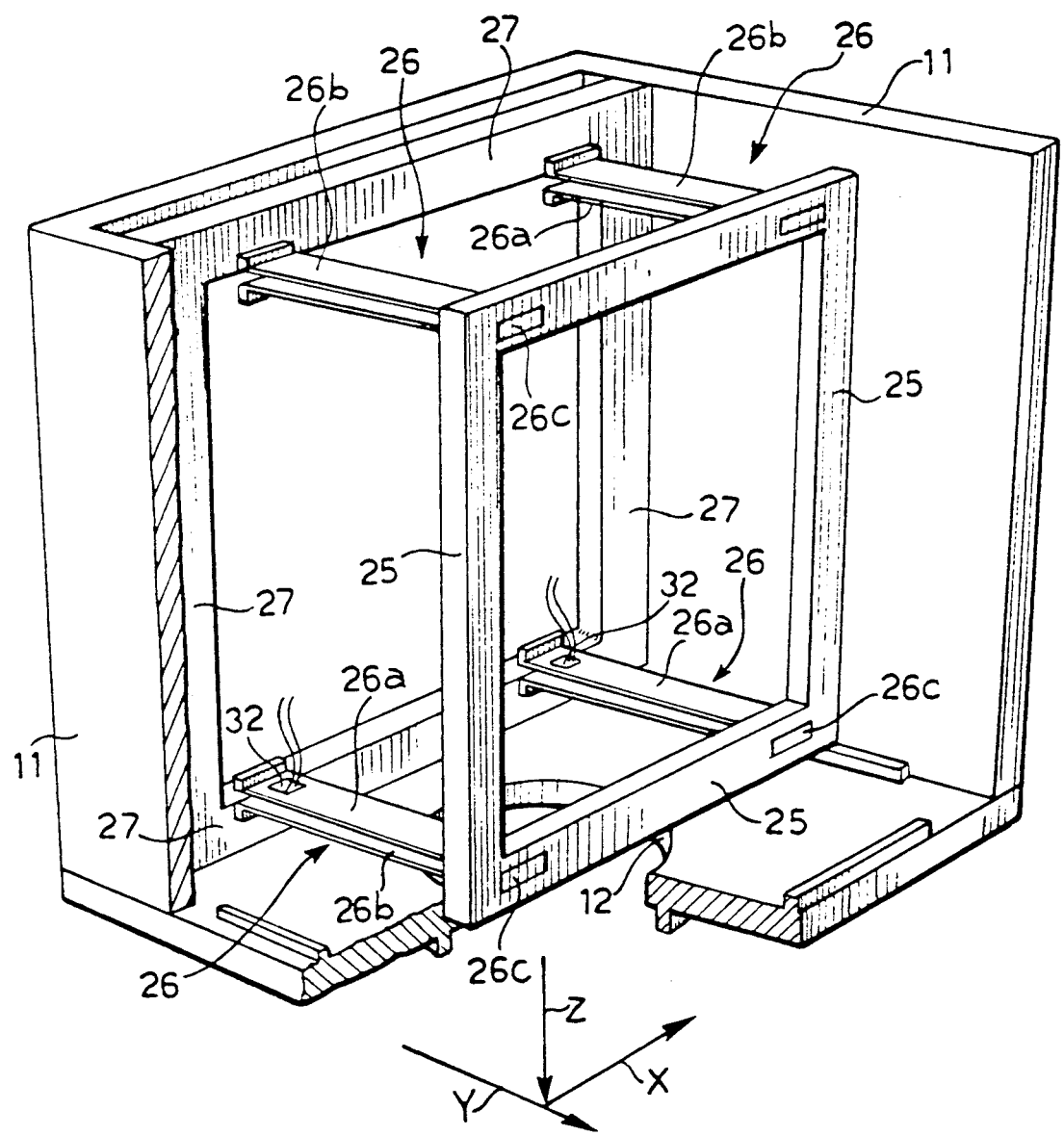
FIG. 8 is a partially-sectioned perspective view of another part of the feeler of FIGS. 1 to 6.
Figure 9:
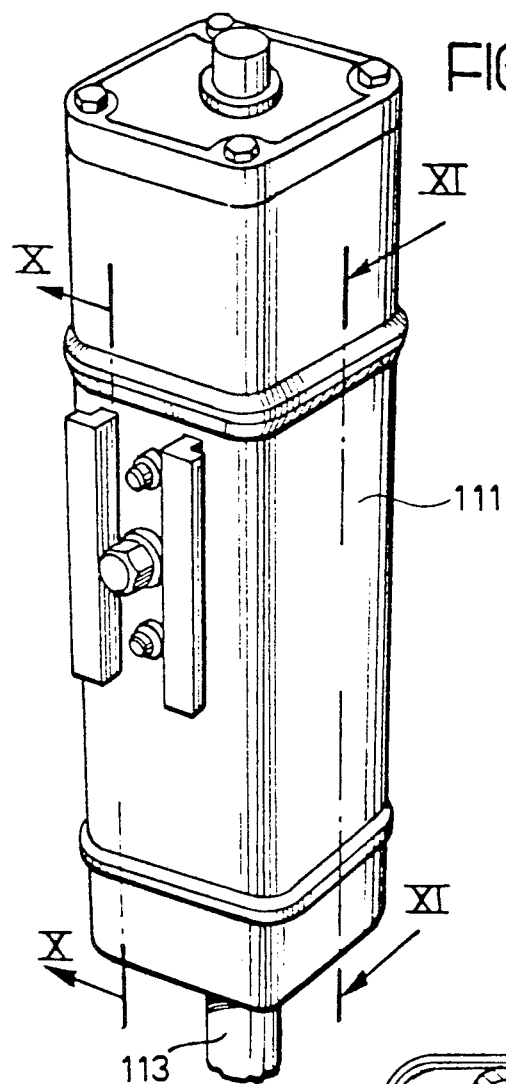
FIG. 9 is a perspective view of another feeler device made in accordance with the present invention.
Figure 12:
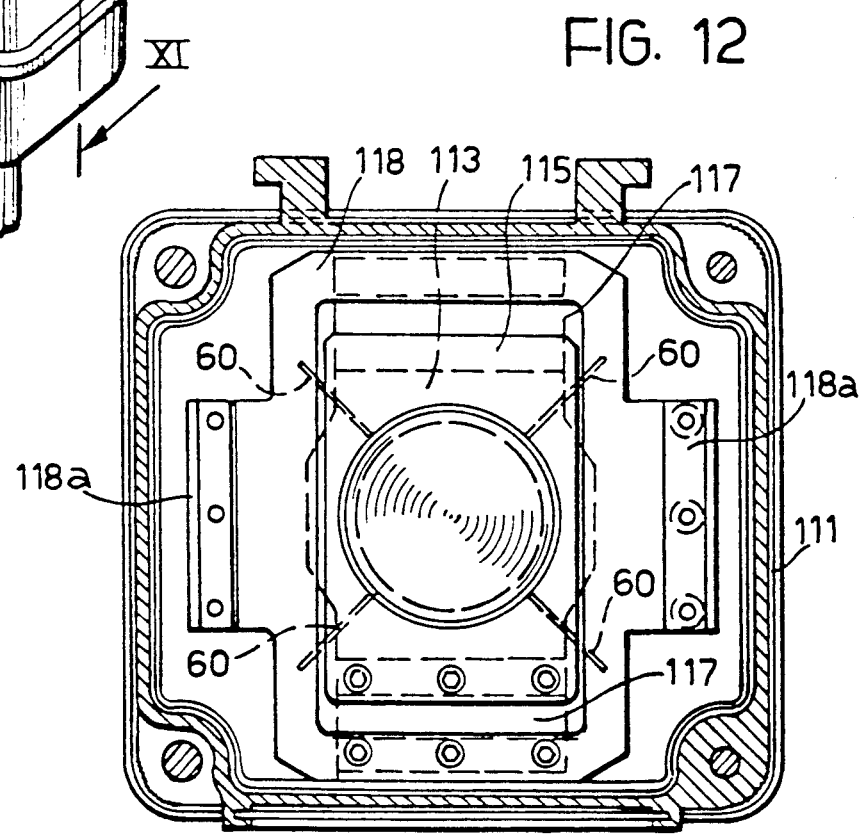
FIG. 12 is a section taken on the line XII—XII of FIG. 11.

Respective deformation sensors, for example extensometers (strain gauges), indicated 30, 31 and 32 in FIGS. 7 and 8, are attached to the innermost blades of the suspension members 17, 20, 26.

These sensors are connected to processing circuits outside the housing 11 by conductors which extend through a connector 33 sealed in a central aperture in the upper wall of the housing 11 (FIG. 3).

A bellows-like element 34 (FIG. 4) is fixed to the edge of the aperture 12 in the lower wall of the housing 11 and is clamped sealingly around the shaft 13.

The housing 11 is conveniently filled with oil of a suitable viscosity.

The feeler device described above with reference to FIGS. 1 to 8 has an extremely compact structure of very little bulk.

A further embodiment of the feeler device according to the invention is illustrated in FIGS. 9 to 13. In these Figures, parts corresponding functionally to parts already described have been given the reference numerals used previously but increased by 100.

In this second embodiment, the feeler device comprises a rigid housing 111 of elongate parallelepipedal shape, having a lower aperture 112 through which the shaft 113 extends with clearance A flexible bellows element 134 provides a seal between the aperture of the housing and the shaft 113. This shaft, as shown FIG. 11, has a tubular structure and its end which projects from the housing carries a needle-holder 50.

Figure 10:
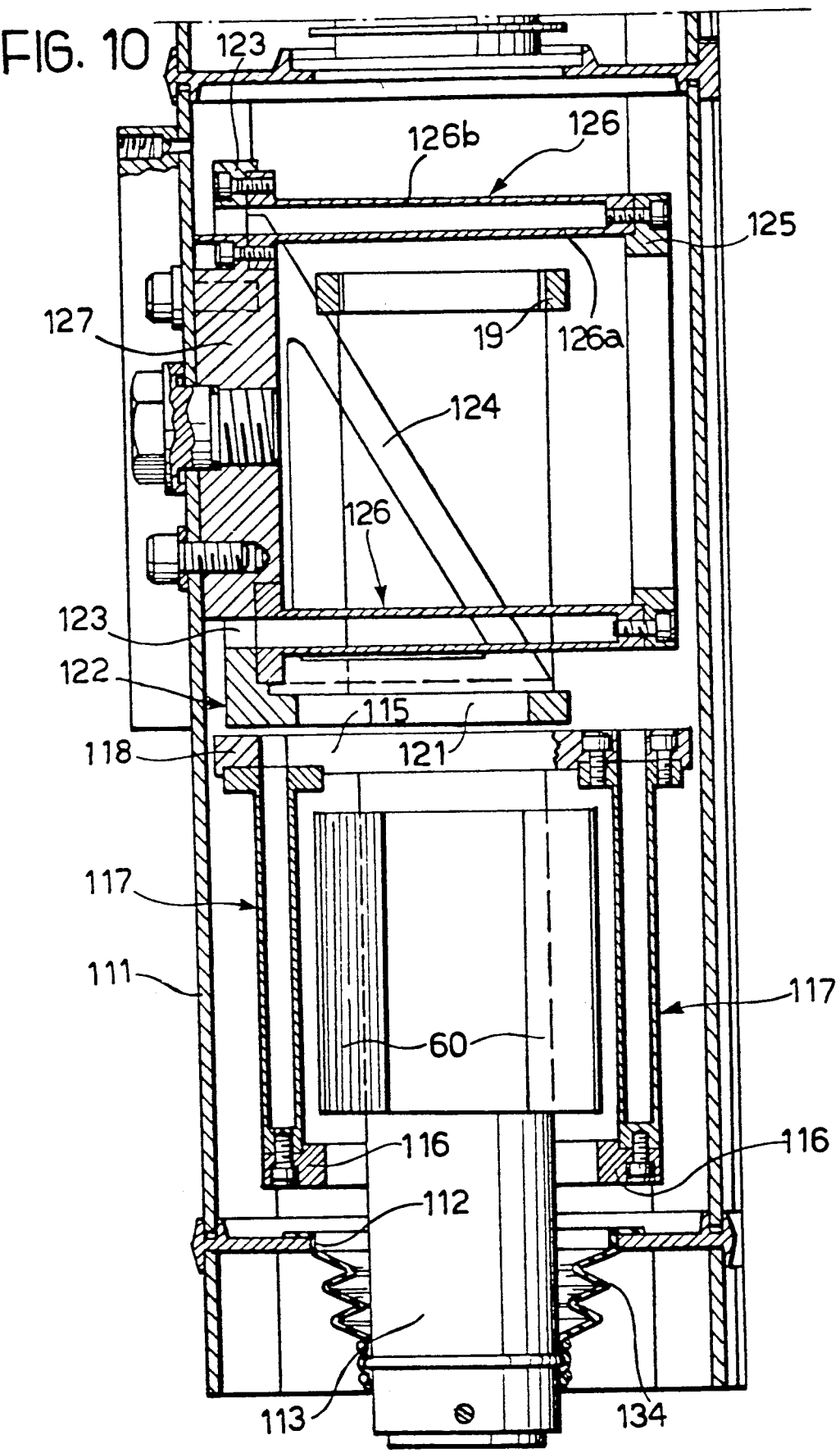
FIGS. 10 and 11 are sections taken on the lines X—X and XI—XI of FIG. 9.
Figure 11:
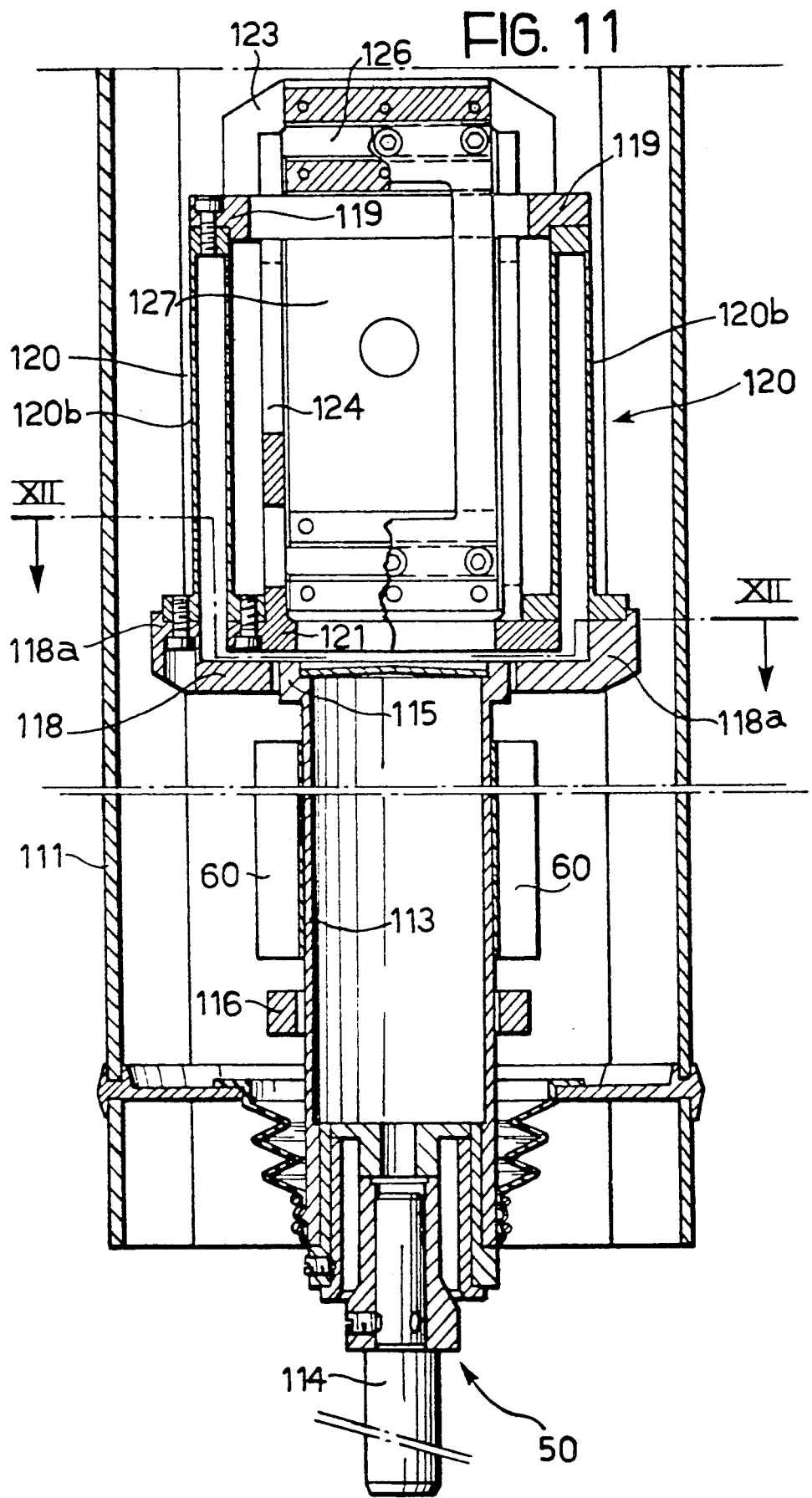
Figure 13:
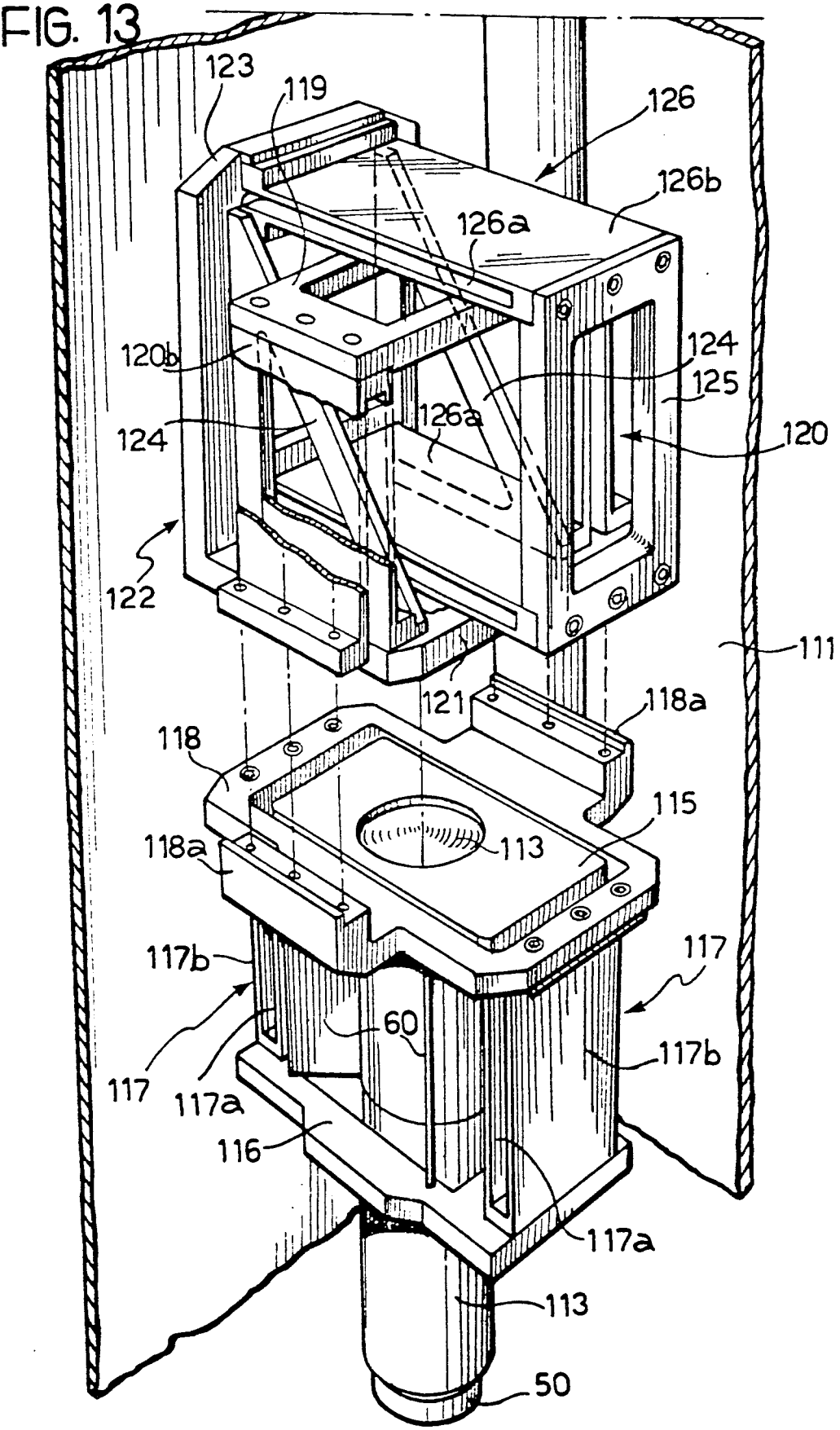
FIG. 13 is a partially-exploded, partial perspective view of the feeler of FIGS. 9 to 12.

The upper end of the shaft 113 is fixed in a central aperture in a rectangular plate 115 A pair of suspension members 117 connects the shorter sides of the plate 115 to a substantially rectangular annular frame 116 located beneath the plate 115 around the shaft 113 (FIGS. 10 and 13). The outer blades 117b of the suspension members 117 connect the frame 116 to a further rectangular frame 118 surrounding the plate 113 with play and coplanar therewith.

Upwardly bent appendages 118a extend outwardly from the longer sides of the frame 118.

Further suspension members 120 have outer blades 120b fixed rigidly at their lower ends to the appendages 118a of the frame 118 The suspension members 120 are fixed rigidly at their upper ends to a rectangular annular frame 119 lying in a plane parallel to and above the plate 115. This frame is connected by the suspension members 120 to the horizontal rectangular annular portion 121 of a frame 122 which also includes a rectangular annular vertical portion 123. The portions 121 and 123 of the frame 122 are also connected by struts 124 integral therewith.

The vertical portion 123 of the frame 122 is connected to a frame 125 by a further pair of suspension members 126 which lie horizontally at rest. The lower suspension member 126 (FIG. 13) extends between the struts 124. The upper suspension member 126 extends above the frame 119.

The frame 125 is connected by the suspension members 126 to a plate 127 fixed internally to a side wall of the housing 111 (FIG. 10). In this case also, the arrangement is such that the vertical portion 123 of the frame 122 is spaced from the wall of the housing 111 to which the plate 127 is connected.

In the feeler device illustrated in FIGS. 9 to 13, the blades of the suspension members 117, 120 and 126 also have attached electrical deformation sensors, for example extensometers. The sensors are not illustrated in these drawings so as not to overburden the representation.

The housing 111 is conveniently filled with oil of a suitable viscosity. The axial portion of the shaft 113 between the plate 115 and the frame 116 has a plurality of equiangularly-spaced radial tabs 60. These tabs have the purpose of optimising the damping of the free and forced oscillations of the shaft 113 in the planes XZ and YZ.

The feeler device of FIGS. 9 to 13 has the following advantages over the embodiment illustrated in FIGS. 1 to 8:

the elongate shape enables better penetration of the device into the cavity in which it must operate;

the moving masses (particularly the elements 121 to 124) are reduced, and the tipping couples are reduced.

Naturally, the principle of the invention remaining the same, the embodiments and details of construction may be varied widely with respect to those described and illustrated purely by way of non-limiting example, without thereby departing from the scope of the present example.

Thus, for example, notwithstanding the fact that in the description above and in the appended drawings feelers have been disclosed in which the feeler member can effect movements on three coordinate axes, it is clear that feeler devices also fall within the scope of the invention in which the feeler member is able to effect movements relative to the supporting structure along only two axes or, at the limit, only one axis.

What is claimed is:

1. Feeler device, particularly for a copying machine tool, comprising:

a support structure (18) movable along at least a first reference axis (X), a feeler member (13, 14) supported by the structure (18) so as to be able to effect limited movements relative to the structure (18) along the axis (X) relative to a predetermined rest position, and sensor means (30) for providing electrical signals indicative of the magnitude and direction of the movement of the feeler member (13, 14) relative to the structure 18, characterized in that it includes a first intermediate structure (16) connected to the support structure (18) by first resiliently deformable blades (17b) which can bend in a direction parallel to the reference axis (X), and in that the feeler member (13, 14) is supported by the intermediate structure (16) through second blades (17a) having bending characteristics substantially the same as those of the first blades (17b) in a direction parallel to the reference axis (X), and in which the support structure (18; 21, 22, 23) can also move along at least a second reference axis (Y) and the feeler member (13, 14) is supported by the structure (18; 21, 22, 23) so as to be able to effect limited movements relative to it along the first and second axes (X,Y), the support structure (18; 21, 22, 23) including a main structure (21, 22, 23) supporting an auxiliary structure (18) fixed to the main structure (21, 22, 23) along the first axis (X) and able to effect limited displacements relative to the main structure (21, 22, 23) along the second axis (Y), characterized in that it includes a second intermediate structure (19) supported by the main structure (21, 22, 23) by third resiliently deformable blades (20b) which can bend in a plane parallel to the second reference axis (Y), the auxiliary structure (18) is supported by the second intermediate structure (19) by means of fourth blades (20a) having substantially the same bending characteristics as the third blades (20b) in a plane parallel to the second axis (Y), and the first intermediate structure (16) is supported by the auxiliary structure (18) by means of the first blades (17b).

2. Device according to claim 1, in which the main support structure (11, 27, 26, 25, 23, 22, 21) is also movable along a third reference axis (Z) and the feeler member (13, 14) is supported by the main structure so as to be able to effect limited relative movements along the first, second and third reference axes (X, Y, Z), the main support structure (11, 27, 26, 25, 23, 22, 21) including a body (11, 27) and a second auxiliary structure (22, 21, 23) fixed to the body (11, 27) according to the first and second axes (X, Y) and able to effect limited relative movements with respect to the body (11, 27) along the third axis (Z), characterised in that it includes a third intermediate structure (25) supported by the body (11, 27) through fifth resiliently deformable blades (26b) which can bend in a plane parallel to the third axis (Z), the second auxiliary structure (21, 22, 23) is supported by the third intermediate structure (25) by means of sixth blades (26a) having substantially the same bending characteristics as the fifth blades (26b) in a plane parallel to the third axis (Z), and the second intermediate structure (19) is supported by the second auxiliary structure (21, 22, 23) by means of the third blades (20b).

3. Device according to claim 2, characterised in that there are two or four fifth blades.

4. Device according to claim 3, characterised in that there are two or four sixth blades.

5. Device according to claim 4, characterised in that the sixth blades are arranged in order between the fifth blades.

6. Device according to claim 5, characterised in that the fifth blades are parallel to each other.

7. Device according to claim 6, characterised in that the sixth blades are parallel to each other.

8. Device according to claim 1, characterised in that there are two third blades (20b).

9. Device according to claim 8, characterised in that there are two fourth blades (20a).

10. Device according to claim 9, characterised in that the fourth blades (20a) are interposed between the third blades (20b).

11. Device according to claim 10, characterised in that the third blades (20b) are parallel to each other.

12. Device according to claim 11, characterised in that the fourth blades (20a) are parallel to each other.

13. A feeler device, comprising:
a support member (18);
a feeler member (13);
means for connecting said feeler member (13) to said support member (18) so that said feeler member is movable from a predetermined rest position relative to said support member (18) along an axis (X); and
sensor means for providing electrical signals indicative of the magnitude and direction of the movement of the feeler member (13) relative to said support member (18) wherein said connecting means includes:
an intermediate member (16);
first resiliently deformable blades (17b) interconnecting said intermediate member (16) to said support member (18) which can bend in a direction parallel to the axis (X) so that said intermediate member (16) is movable relative to said support member (18); and
second resiliently deformable blades (17a) interconnecting said intermediate member (16) to said feeler member (13) disposed parallel to said first blades (17b) and having bending characteristics substantially the same as said first blades (17b) in a direction parallel to the axis (X).

14. Device according to claim 13, characterised in that there are two first blades (17b).

15. Device according to claim 14, characterised in that there are two second blades.

16. Device according to claim 13, characterised in that the second blades (17a) are interposed between the first blades (17b).

17. Device according to claim 13, characterised in that the first blades (17b) are parallel to each other.

18. Device according to claim 13, characterised in that the second blades (17a) are parallel to each other.

19. Device according to claim 1, characterised in that the detector means comprise extensometric sensors (30, 31, 32) coupled to at least some of the blades.

* * * * *